(12) United States Patent
Krawinkel

(10) Patent No.: US 8,454,393 B2
(45) Date of Patent: Jun. 4, 2013

(54) DEVICE AND METHOD FOR THE CAPTIVE ACCOMMODATION OF A SCREW IN A TERMINAL

(75) Inventor: Matthias Krawinkel, Steinheim (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 307 days.

(21) Appl. No.: 12/741,488

(22) PCT Filed: Nov. 22, 2008

(86) PCT No.: PCT/EP2008/009916
§ 371 (c)(1),
(2), (4) Date: Jun. 29, 2010

(87) PCT Pub. No.: WO2009/068229
PCT Pub. Date: Jun. 4, 2009

(65) Prior Publication Data
US 2010/0267284 A1 Oct. 21, 2010

(30) Foreign Application Priority Data
Nov. 30, 2007 (DE) .......................... 10 2007 058 040

(51) Int. Cl.
*H01R 4/36* (2006.01)
(52) U.S. Cl.
USPC ......................................... 439/813; 439/811
(58) Field of Classification Search
USPC ................................................ 439/810–814
See application file for complete search history.

(56) References Cited

U.S. PATENT DOCUMENTS

| | | | | | |
|---|---|---|---|---|---|
| 4,478,478 | A | * | 10/1984 | Durand et al. | 439/723 |
| 4,669,806 | A | * | 6/1987 | Fuchs | 439/712 |
| 4,790,778 | A | * | 12/1988 | Seidenbusch | 439/811 |
| 4,830,627 | A | * | 5/1989 | Heng et al. | 439/586 |
| 6,497,592 | B1 | * | 12/2002 | Beadle | 439/814 |
| 7,387,547 | B1 | * | 6/2008 | Fuzetti | 439/798 |

FOREIGN PATENT DOCUMENTS

| | | |
|---|---|---|
| CH | 511522 A | 8/1971 |
| DE | 9308096 U1 | 7/1993 |
| DE | 29621267 U1 | 4/1997 |
| FR | 2392516 A1 | 12/1978 |

OTHER PUBLICATIONS

International Search Report, PCT/EP2008/009916, dated Mar. 10, 2009, 2 pages.

* cited by examiner

*Primary Examiner* — Hien Vu
(74) *Attorney, Agent, or Firm* — Senniger Powers LLP

(57) ABSTRACT

The invention relates to a terminal having a housing and a duct for accommodating a screw, wherein a securing device is provided that has a holding unit configured on the housing in order to enable the captive accommodation of the screw in the duct. The securing device enables an insertion of a screw into the duct in the base state, wherein a secured state is achieved after insertion of a screw by a plastic deformation of the holding unit into the free cross-section of the duct in which a screw is captively accommodated.

11 Claims, 1 Drawing Sheet

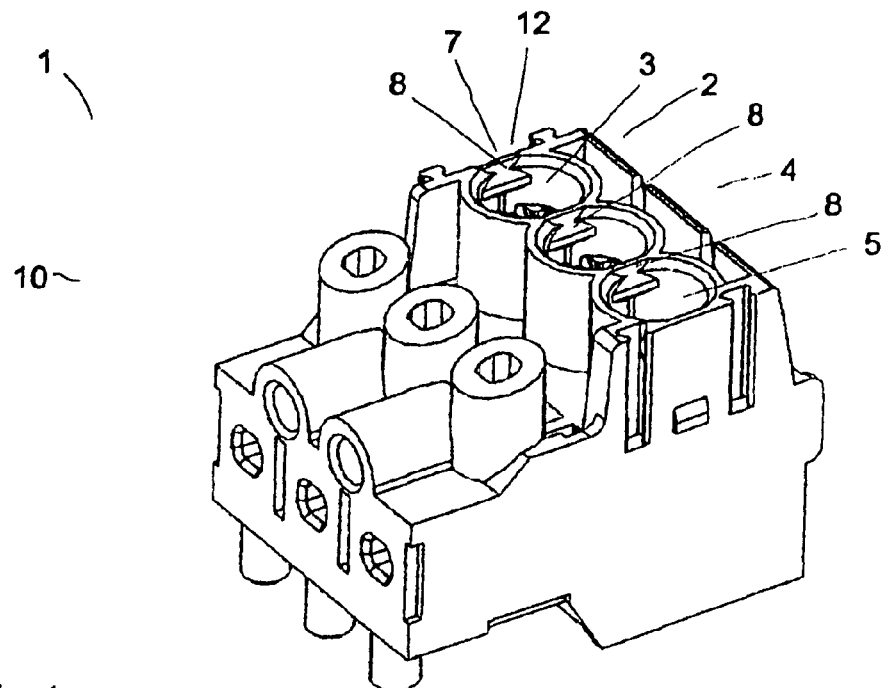
Fig. 1
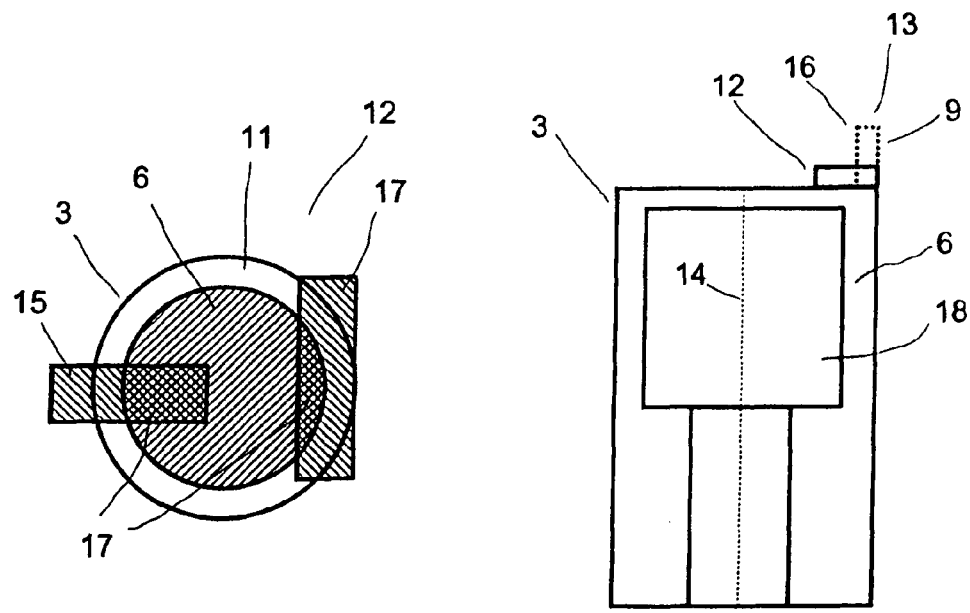
Fig. 2
Fig. 3

DEVICE AND METHOD FOR THE CAPTIVE ACCOMMODATION OF A SCREW IN A TERMINAL

REFERENCE TO RELATED APPLICATION

This application claims priority to German application 10 2007 058 040.3 filed Nov. 30, 2007.

FIELD OF THE INVENTION

The invention concerns a device and a method for the countersunk receipt of a screw at a connector terminal or another electrical or electronic component. The device according to the invention includes a housing and at least one shaft provided thereon for receiving a screw in order to secure a conductor or to fasten the housing, for instance, to another component. In this way, the screw is received into the shaft of the housing and is held countersunk in the shaft by means of a securing arrangement.

BACKGROUND

Securing arrangements are known in prior art. For example, a screw terminal is known from DE 296 21 267 U1 in which the head of the screw is covered up by a housing cover, up to the screwdriver opening. Shaped ribs are provided which are axially distributed over the perimeter on the housing cover, which are a very short distance from one another, less than the diameter of the screw head. When screwing the terminal screw in, the ribs are deformed and abraded in this prior art. Due to the elasticity of the ribs, the screw is received partially countersunk into the cover housing.

It is a disadvantage in this prior art, though, that the ribs extending in the longitudinal direction of the screw to the housing cover have to be manufactured to correspond exactly to the screws to be used, in order to guarantee a secure operation. The tolerances to be met are dimensioned very narrowly, since the ribs, on the one hand, have to enable the screw to be screwed in without ruining the housing cover by overscrewing, while on the other hand, the screw has to be held securely after insertion.

This leads to the need to hold to the measurements exactly and causes high manufacturing expense and consequently higher production costs.

A series terminal is known from DE 30 28 958 C2, in which the terminal screw can be disposed sunk into a shaft of a body. In the shaft, a section is provided which allows elastic deformation when screwing in the screw and when painting over the head. After painting over the section, the section only partially deforms back again, so that the section executed serves as a locking device.

Also, in this arrangement known from prior art, very close coordination of the structural dimensions and the observance of very close manufacturing tolerances is required to reliably prevent ruining the component when screwing and to prevent loss of the screw inserted.

Furthermore, devices are known from prior art in which a rib is provided running around the shaft receiving the screw, which exhibits an open inside diameter smaller than the large outside diameter of the head of the screw. If a screw is inserted into such a shaft and goes past the ring-shaped rib, then it is received countersunk in the shaft. Also, for a functioning solution, this requires, however, precise coordination of the manufacturing tolerances, since with automated screw assembly, the screw shanks can be torn off otherwise, if the turning force exceeds the strength of the component when pressing on the head of the screw. Such a system works with slower assembly by hand or also when holding precisely to the tolerances, which in turn causes considerable manufacturing engineering expense and consequently higher costs.

SUMMARY OF THE INVENTION

Faced with the prior art cited, it is for that reason the goal of the present invention to offer a device and a method for the countersunk receipt of a screw at an electrical component and in particular at a connector terminal, in which looser manufacturing tolerances can be reliably achieved and high reliability in securing receipt can be obtained.

This goal is achieved by means of a device with the characteristics of claim 1 and by a method with the characteristics of claim 7. Preferred embodiments of the invention are the object of the respective subclaims; further preferred characteristics of the invention are given in the embodiment example.

The device according to the invention is executed in particular as an electrical connector terminal and includes a housing and at least one shaft provided thereon for receiving a screw. At least one securing arrangement is provided with at least one holding arrangement formed at the housing to enable a screw to be received countersunk in the shaft. According to the invention, the securing arrangement in the initial state enables insertion of a screw into the shaft of the housing. After inserting a screw, a secured state can be obtained therein, with the device according to the invention, in which a screw is received countersunk by plastic reshaping of the holding arrangement in the open cross-section of the shaft.

The device according to the invention has considerable advantages. By making available a particularly undisturbed shaft accessibility in the initial state, the screw can be inserted without appreciable interference into the shaft, and simple insertion of the screw into the shaft of the housing is made possible.

Wedging of the screw in the shaft is reliably avoided, since the screw does not have to displace the securing arrangement during insertion.

A further considerable advantage is that the securing arrangement or the holding arrangement of the securing arrangement can be carried over to a secured state, in which the holding arrangement rises up into the open cross-section of the shaft to thus receive the screw countersunk. At the same time, the open cross-section of the shaft is reduced, in such a way that the screw or at least the head of the screw can no longer go past the securing arrangement from the shaft.

High securing reliability is obtained by plastic reshaping after inserting the screw, while at the same time, especially loose manufacturing tolerances are possible but not required. In practice, there is no relationship between the tolerances of the securing arrangement and the tolerances of the shaft or the screw, if the securing arrangement of the shaft protrudes sufficiently far. There does not need to be a compromise between insertability and the securing properties, as was the case in the prior art. It is also advantageous if the plastic reshaping be caused not by the screw itself but especially by a separate tool.

In a preferred embodiment of the invention, at least one holding arrangement is formed as a raised part, on the housing in particular, which in the initial state sticks out from the housing in the longitudinal direction of the shaft. Preferably, this raised part carries over into the secured state due to plastic reshaping after inserting the screw, in which the raised part extends up into the open shaft area.

In a further preferred embodiment, at least one holding arrangement is formed as an elongated loop or as an elongated peg, which rises partially up into the open cross-section of the shaft due to plastic reshaping.

Especially preferred is at least one holding arrangement that is formed in one piece with the housing and is, in particular, injection-molded thereonto. Because of this, simple product manufacture is made possible.

In preferred embodiments, a plurality of holding arrangements can be provided on the shaft. For example, two, three, or more holding arrangements are disposed around the shaft, symmetrically, for instance, which extend tangentially or radially up into the shaft after the plastic deformation and carryover to the secured state.

It is also possible that a peg or something similar is provided on the shaft, which after plastic deformation projects at least partially as an upper length projecting above the accessible end of the shaft, and thus the screw is secured in the shaft.

In all the embodiments, sufficient free space preferably remains available at the shaft in the secured state to insert, at the securing arrangement, a tool, particularly a screwdriver, along with the screw, and to turn the screw with it.

With the method according to the invention for securing a screw at an electrical component, particularly at a connector terminal, a screw is inserted into a shaft of a housing, and then the screw is secured in the shaft against falling out unintentionally.

For this, after inserting the screw, at least one holding arrangement is made by reshaping, which projects radially inward as a securing arrangement and thus receives the screw countersunk in the shaft.

The method according to the invention also has considerable advantages, since a simple method is offered for countersunk receipt of a screw at a connector terminal, for example. A holding arrangement is made or reshaped by plastic deformation, and countersunk receipt is enabled, without the securing arrangement, the screw, and the shaft having to meet precise manufacturing tolerances.

By means of the simple procedural step of reshaping the housing material or a separate holding arrangement, a simple step occurs before assembly or when packing the component which makes the reliable and cost-effective securing of the screw in the shaft possible.

In a preferred embodiment of the method, projections sticking out from the housing into the open cross-section of the shaft are bent to hold the screw countersunk in the shaft. By means of simple injection molding of such projections when manufacturing the housing, such holding arrangements are readily made available, which are then mechanically or thermally reshaped and applied.

It is also preferred that, after inserting the screw into the shaft, an upper projecting length be produced directly with a tool, by plastically deforming the housing, in particular. For example, plastic deformation of the housing can be achieved using a sharp-edged or pointed object, which is placed against the shaft of the housing, which is a sufficient holding arrangement to receive the screw countersunk into the shaft.

In an especially simple case, just the insertion, if necessary, of a Phillips screwdriver of appropriate size is enough, which is placed in the shaft so that the plastic deformation of the accessible end of the shaft is achieved with a light tap, whereby a holding arrangement is produced due to the deformation of the shaft and/or the housing.

Besides plastic deformation by cold working, plastic deformation by hot working can also be done, particularly with a hot die-stamp, in which heat is produced by the direct application of heat or by ultrasound or some such thing, so that plastic deformation of the material occurs.

In all the embodiments previously described, the shaft and the housing are preferably made at least in part out of an elastic material and can be at least in part or in whole composed of a thermoplastic material, which is well suited to plastic deformation.

Further advantages and characteristics of the present invention are revealed from the description of an embodiment example, which is explained in the following with reference to the enclosed drawings.

BRIEF DESCRIPTION OF THE DRAWINGS

The figures show:

FIG. 1 a perspective view of a connector terminal according to the invention;

FIG. 2 a highly schematic view of a screw that is received countersunk into a shaft; and FIG. 3 a highly schematic cross-section of a screw that is received countersunk in a shaft.

DETAILED DESCRIPTION OF PREFERRED EMBODIMENTS

This application claims priority to German application 10 2007 058 040.3 filed Nov. 30, 2007, the entire disclosure of which is incorporated by reference.

With reference to FIGS. 1-3, an embodiment example is described in the following for a device 1 according to the invention, which is executed here as an electrical connector terminal 10 and which has available several conductor connections.

The connector terminal 10 represented in perspective in FIG. 1 exhibits a housing 2, on which are provided, in the embodiment example here, three shafts 3, 4, and 5, each of which is provided with a screw 6 for the countersunk receipt of a screw (cf. FIG. 2).

The connector terminal 10 represented in perspective in FIG. 1 is represented in the secured state 12, in which the securing arrangement 7, with the holding arrangement 8 (i.e., retaining element, reliably prevents each screw 6 received in the shafts 3-5 from falling out.

Here, in the embodiment example according to FIG. 1, each securing arrangement 7 includes, to be precise, a holding arrangement 8, which, in the secured state 12, is bent and projects, plastically deformed, into the open cross-section 11 of the respective shaft 3-5, so that the remaining cross-section available is less than the minimum diameter of the screw head 18 (cf. FIG. 3). At the same time, sufficient free space still remains in the shaft to insert a tool into the respective shaft 3-5 to tighten or loosen the screw.

In the initial state 9, represented by a dotted line in FIG. 3, the respective holding arrangements 8 are given here, so that the screws 6 can be inserted into the shafts 3-5 with some play. This allows for large tolerances in manufacture and for simple assembly.

Xx3: In another embodiment, the holding arrangement 8 can, in the initial state 9, also cover a part of the open cross-section of the shaft, provided that it is ensured that the screw 6 can be inserted into a shaft and then be secured by plastic deformation. Preferably, the entire cross-section of the respective shaft 3-5 remains open in the initial state 9.

After inserting the screw 6, the holding arrangement 8, which can be formed as a raised part 13 or projection 16 or as a loop 15, can be plastically deformed and bent into the open cross-section 11 of the shaft 3. Due to the plastic deformation, the upper end of the shaft 3 is partially closed, so that the screw 6 is received countersunk into the shaft 3.

The upper projecting length 17, in elongated form in FIG. 2, covers an area of the cross-section 11 sufficient to reliably hold back the screw in the shaft 3 in the secured state 12. In addition, nothing is changed by vibrations thereto, as shaking tests have demonstrated.

In the initial state 9, represented as dotted in FIG. 3, the upper projecting length 17 is formed as a projection 16 or a raised part 13, as is represented in FIG. 3.

Preferably, the holding arrangements 8 are connected as one piece to the housing 2 or to the respective shaft 3-5 and particularly to a shaft or housing which was already injection molded during manufacture.

In all the embodiments, the shaft is preferably made from a plastic and in particular, at least partially from an elastic plastic, such as a thermoplastic, for example. This facilitates plastic deformation of the holding arrangement, because plastic deformations are possible in thermoplastic materials by both cold working and hot working, in which brittle fractures are largely avoided.

Unlike the representations according to FIGS. 1-3, the holding arrangement can also be made available by plastic deformation of the rim of the shaft, in which material in the vicinity of the shaft is displaced in such a way that it projects into the open cross-section of the shaft as an upper length projecting above the screw 6 received in the shafts 3-5.

For example, a pointed spike can be provided, which is set on a tool executed as a die, for instance, and which presses the screw into the shaft. Immediately after inserting the screw into the shaft, it is thereby ensured that the screw is reliably received, because in using the die, the plastic deformation of the shaft or of the housing also occurs directly.

The insertion of a slotted or cruciform tool to deform the shaft wall is also possible in order to produce an upper length projecting above the screw.

In the embodiments described, clearly looser tolerances are customary nowadays, so that manufacturing tolerances can be reduced, and consequently the production of the component inserted is simpler and less expensive. At the same time, the reliability with which the screws are received into the shafts or into the connector terminals is considerably increased, while the proportion of defective manufactured parts is reduced.

The insertion of a warm and especially a hot tool is possible and preferred, in order to obtain flow and plastic deformation by softening the material.

In plastic deformation using a spike or something similar, the deformed surface sites can exhibit waves or other deformations, whose optical appearance extends to sites not immediately visible and then again often fully extends to other sites.

With plastic deformations by bending or by inserting tools that deform the component thermally, high or very high requirements for sufficient optical quality can be achieved.

REFERENCE LIST

1 Device
2 Housing
3 Shaft
4 Shaft
5 Shaft
6 Screw
7 Securing arrangement
8 Holding arrangement
9 Initial state
10 Connector terminal
11 Open cross-section
12 Secured state
13 Raised part
14 Longitudinal direction
15 Loop
16 Projection
17 Upper projecting length
18 Screw head

The invention claimed is:

1. A connector terminal comprising:
a housing;
a shaft on the housing having an open cross section for receiving a screw of a type having a screw head;
a retaining element on the housing which is adapted to permit the screw to be received countersunk into the shaft;
wherein the retaining element has an initial state adapted to permit insertion of a screw including screw head into the shaft, and wherein the retaining element further has a secured state obtainable by plastic reshaping of the retaining element, in which secured state, after insertion of the screw into the open cross section of the shaft, the screw is held in the shaft and cannot be moved past the retaining element and out of the shaft;
wherein the retaining element is formed as a raised part which in the initial state sticks out from the housing in the longitudinal direction of the shaft and which is movable to the secured state by being bent into the open cross-section of the shaft.

2. The connector terminal of claim 1 in which the retaining element is formed as an elongated loop or as an elongated peg.

3. The connector terminal of claim 1 wherein the retaining element is formed in one piece with the housing and is injection molded.

4. The connector terminal of claim 1 comprising two or more of said shafts and two or more retaining elements, one for each of said two or more shafts.

5. The connector terminal of claim 4 in which the retaining elements are disposed symmetrically around the shafts.

6. The connector terminal of claim 1 wherein the retaining element in the secured state is an upper projecting piece of material projecting over the open cross section of the shaft.

7. A method for securing the screw having the screw head into the connector terminal as claimed in claim 1, comprising:
inserting the screw having the screw head into the shaft of the housing of the connector terminal to countersink the screw in the shaft; and
securing the screw in the shaft against falling out unintentionally by positioning the retaining element to extend radially inward into the shaft.

8. The method according to claim 7 wherein positioning the retaining element comprises reshaping the holder to extend into the open cross-section of the shaft above the screw head to hold the screw countersunk in the shaft.

9. The method according to claim 7 wherein, after inserting the screw into the shaft, positioning the retaining element to extend radially inward into the shaft comprises deforming the retaining element.

10. The method according to claim 7 wherein positioning the retaining element to extend radially inward into the shaft comprises cold working.

11. The method according to claim 7 wherein positioning the retaining element to extend radially inward into the shaft comprises hot working.

* * * * *